United States Patent
Hartenstine et al.

(10) Patent No.: US 7,651,115 B1
(45) Date of Patent: Jan. 26, 2010

(54) SECONDARY LOCK FOR STROLLER FOLD MECHANISM

(75) Inventors: Curtis M. Hartenstine, Birdsboro, PA (US); James M. F. Hutchinson, Mohnton, PA (US)

(73) Assignee: Wonderland Nurserygoods Co., Ltd., Taipei (TW)

( * ) Notice: Subject to any disclaimer, the term of this patent is extended or adjusted under 35 U.S.C. 154(b) by 617 days.

(21) Appl. No.: 11/499,121

(22) Filed: Aug. 4, 2006

(51) Int. Cl.
 B62B 1/00 (2006.01)
 B62B 7/00 (2006.01)
 B62B 3/00 (2006.01)
 B62B 9/00 (2006.01)
 B62B 5/00 (2006.01)

(52) U.S. Cl. ............... 280/642; 280/639; 280/640; 280/647; 280/651; 280/655; 280/657; 280/658; 280/47.131; 280/47.25; 280/47.26; 280/47.38

(58) Field of Classification Search ............ 280/639, 280/640, 642, 647, 651, 655, 657, 658, 47.131, 280/47.25, 47.26, 47.38
See application file for complete search history.

(56) References Cited

U.S. PATENT DOCUMENTS 4,614,454 A * 9/1986 Kassai .................. 403/62
6,102,431 A * 8/2000 Sutherland et al. ........ 280/642
6,339,862 B1 * 1/2002 Cheng ..................... 16/113.1
6,375,213 B1 * 4/2002 Suzuki ..................... 280/649
6,422,587 B1 7/2002 Yamakazi ................ 280/647
6,443,479 B2 * 9/2002 Huang ..................... 280/642
6,478,328 B1 * 11/2002 Yeh et al. ................. 280/650
6,565,111 B2 * 5/2003 Ageneau .................. 280/647
6,910,709 B2 * 6/2005 Chen ...................... 280/642
2003/0168833 A1 * 9/2003 Chen ...................... 280/642
2005/0029775 A1 * 2/2005 Chen ...................... 280/647
2006/0131840 A1 * 6/2006 Donay .................... 280/642

* cited by examiner

*Primary Examiner*—Paul N Dickson
*Assistant Examiner*—John R Olszewski
(74) *Attorney, Agent, or Firm*—Miller Law Group, PLLC

(57) ABSTRACT

A secondary lock device for a one-hand fold mechanism on a child's stroller is pivotally mounted next to the actuator of the one-hand fold mechanism. The secondary lock device is positioned for convenient access by a finger of the operator to provide an intuitively operable secondary lock device cooperable with the one-hand fold actuator. The secondary lock device is spring-loaded by a torsion spring mounted on the rotational axis of the adjacent cam member forming part of the one-hand fold mechanism. The pivoted lock member includes an outwardly projecting member that engages a corresponding niche in the actuator when in a locking position. The outwardly projecting member rides along a cam surface on the actuator when the actuator is being operated, while the biasing spring returns the outwardly projecting member into the niche when the actuator reaches the home position.

19 Claims, 4 Drawing Sheets

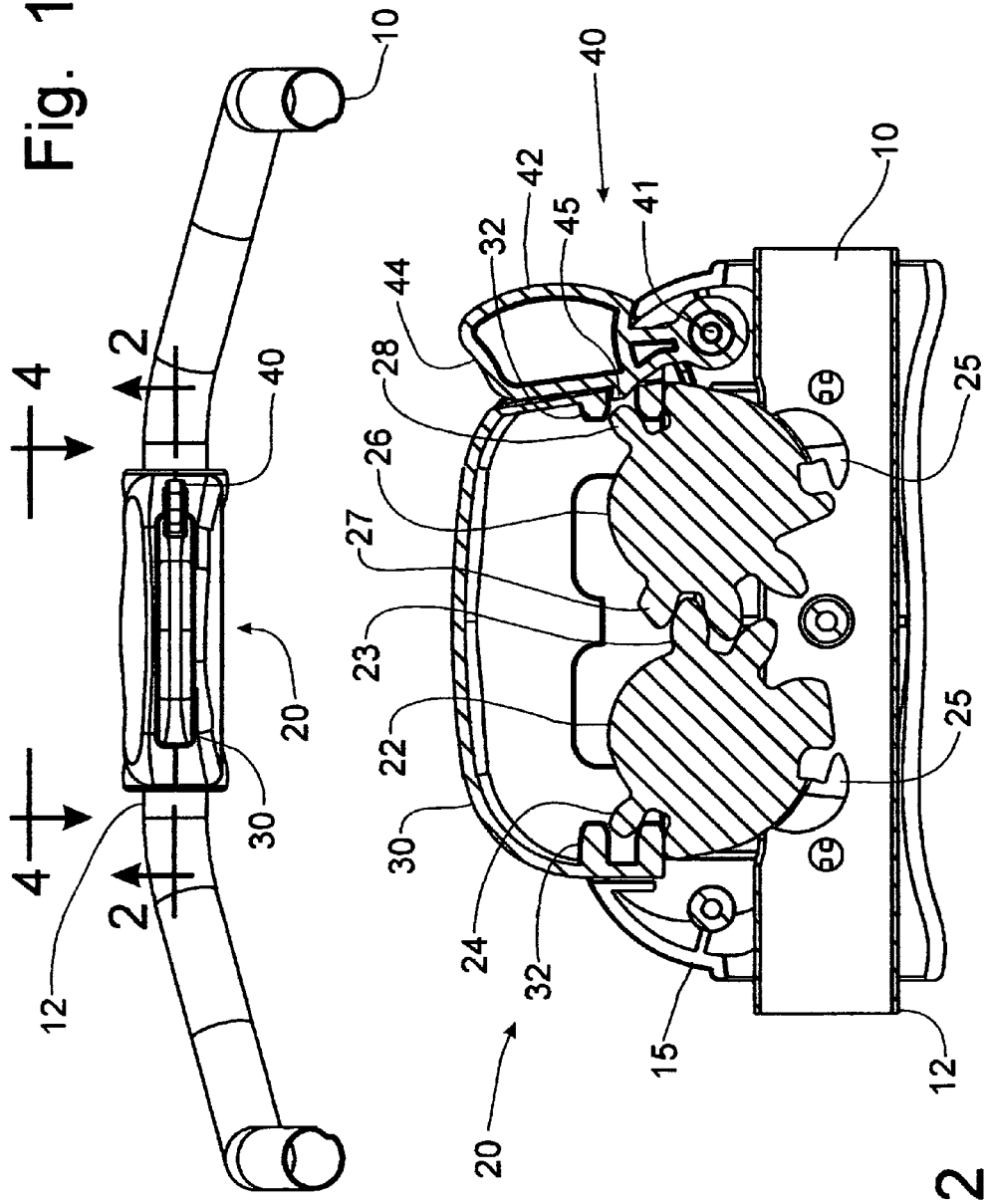

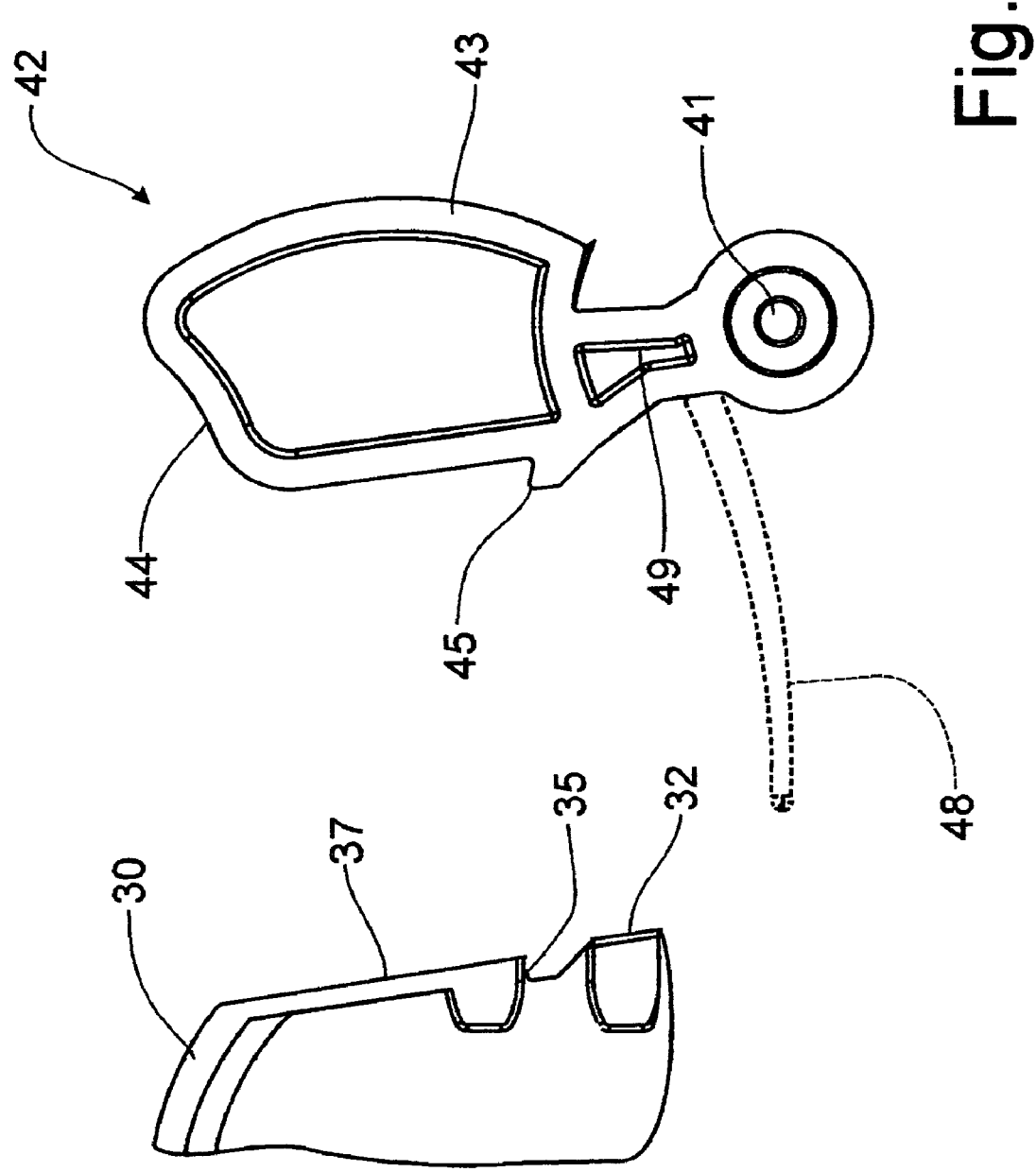

SECONDARY LOCK FOR STROLLER FOLD MECHANISM

BACKGROUND OF THE INVENTION

The present invention relates generally to a one-hand folding mechanism used for strollers, and, more particularly, to a secondary lock mechanism cooperable with the fold mechanism to restrict accidental actuation thereof.

For the sake of minimizing the physical volume of child's stroller to facilitate transportation thereof in a non-active configuration, foldable strollers have been developed. Recent developments in these foldable strollers have provided a folding mechanism that is operable to convert the stroller from an expanded operational configuration to a folded transport configuration. Locking devices are often associated with the folding mechanisms to limit the accidental actuation of the mechanism. Some folding mechanisms require the use of two hands to operate; others are designed such that the stroller can be converted into the transport configuration through the use of a single hand.

One such folding mechanism can be found in U.S. Pat. No. 6,339,862, issued to Kenny Cheng on Jan. 22, 2002, in which the folding mechanism incorporates a pair of rotatable cams having teeth formed on the circumference thereof. An actuator trigger includes a central rack that engages the teeth of both cams simultaneously to cause rotation thereof when depressed. The rotating cams pull on wires that cause the stroller to fold into the transport configuration. The Cheng patent is silent as to a locking device to cooperate with the folding mechanism to limit utilization thereof. A locking device for use with rotatable cam folding mechanisms can be found, however, in U.S. Pat. No. 4,614,454, granted to Kenzou Kassai on Sep. 30, 1986, in which a push button depresses a catch member seated in a formed receptacle in the two pinions. When the catch member is depressed out of the receptacle, the pinions are free to rotate and operate the locking mechanism.

Other rotating cam member folding mechanisms can be found in U.S. Pat. No. 6,102,431, granted to Scott Sutherland on Aug. 15, 2000. The associated locking mechanism is a spring-loaded wedging piston engagable with pivoted actuating lever. When the piston is wedged between the intermeshing cogs to keep the cogs from rotating, the cogs cannot operate to fold the stroller. In U.S. Pat. No. 6,422,587, issued to Kojiro Yamazaki on Jul. 23, 2002, a single rotatable cam is operated with cables attached to circumferentially opposing sides thereof operates the folding mechanism. A locking device does not appear to be disclosed, but the specification discusses a spring that would assist in the conversion of the stroller between operating and transport configurations.

Pivoted pawls depicted in U.S. Pat. No. 6,443,479, granted to Ying-Yuan Huang on Sep. 3, 2002, operate similarly to the aforementioned rotatable cams. In the Huang patent, the locking mechanism is shown in the form of a spring-loaded safety latch that rides internally within a slot when released from engagement with the actuating lever, which can then pivot the pawls to convert the stroller into the transport configuration. The locking mechanism in U.S. Pat. No. 6,478,328, granted to Chuan-Ming Yeh, et al. on Nov. 13, 2002, is also spring-loaded to move into engagement with one of the pivoted pawls. The accessible latch member is manually accessible to retract the latch member from engagement with the pawl to allow the actuator trigger to cause pivotal movement of the pawls and, thus convert the stroller into the transport configuration.

Accordingly, it would be desirable to provide a secondary latch mechanism that would be particularly adaptable to use with rotating cam folding mechanisms and be operable to conveniently release the actuation trigger for operative movements.

SUMMARY OF THE INVENTION

It is an object of this invention to provide a secondary lock device for a one-hand fold mechanism on a child's stroller that is particularly usable with a rotatable cam member mechanism.

It is a feature of this invention that the secondary lock device is directly engagable with the actuator to lock the actuator in a home position. It is another feature of this invention that the secondary lock device is positioned for convenient access by the user's finger before enabling the one hand fold actuator.

It is still another feature of this invention that the secondary lock device is spring-loaded toward the engagement position.

It is an advantage of this invention that the secondary lock device automatically engages the actuator whenever the actuator is returned to the home position.

It is yet another feature of this invention that the spring biasing the secondary lock device is mounted on the rotational axis of one of the cam members rotated by the actuator in operating the one hand fold mechanism.

It is another advantage of this invention that the manually operated secondary lock device is intuitively operable.

It is still another advantage of this invention that the secondary lock device is pivotally mounted next to the actuator for the one-hand fold mechanism.

It is still another feature of this invention that the biasing spring is a torsion spring.

It is another object of this invention to provide a secondary lock device for a rotatable cam member fold mechanism on a stroller that is durable in construction, inexpensive of manufacture, carefree of maintenance, facile in assemblage, and simple and effective in use.

These and other objects, features and advantages are accomplished according to the instant invention by providing a secondary lock device for a one-hand fold mechanism on a child's stroller that is pivotally mounted next to the actuator of the one-hand fold mechanism. The secondary lock device is positioned for convenient access by a finger of the operator to provide an intuitively operable secondary lock device cooperable with the one-hand fold actuator. The secondary lock device is spring-loaded by a torsion spring mounted on the rotational axis of the adjacent cam member forming part of the one-hand fold mechanism. The pivoted lock member includes an outwardly projecting member that engages a corresponding niche in the actuator when in a locking position. The outwardly projecting member rides along a cam surface on the actuator when the actuator is being operated, while the biasing spring returns the outwardly projecting member into the niche when the actuator reaches the home position.

BRIEF DESCRIPTION OF THE DRAWINGS

The advantages of this invention will be apparent upon consideration of the following detailed disclosure of the invention, especially when taken in conjunction with the accompanying drawings wherein:

FIG. 1 is a partial elevational view of a grip portion of a handle bar for a child's stroller incorporating the principles of the instant invention, the remaining portions of the handle bar being broken away for purposes of clarity;

FIG. 2 is a cross-sectional view of the actuation portion of the one-hand fold mechanism for the child's stroller incorporated into the grip portion of the handle bar corresponding to lines 2-2 of FIG. 1, the one-hand fold mechanism being shown in the locked position;

FIG. 7 is an enlarged partial elevational view of the niche portion of the actuator member engagable with the secondary lock member; and FIG. 8 is an enlarged elevational view of the secondary lock member, the spring being shown in phantom.

DETAILED DESCRIPTION OF THE PREFERRED EMBODIMENT

Figure 3:
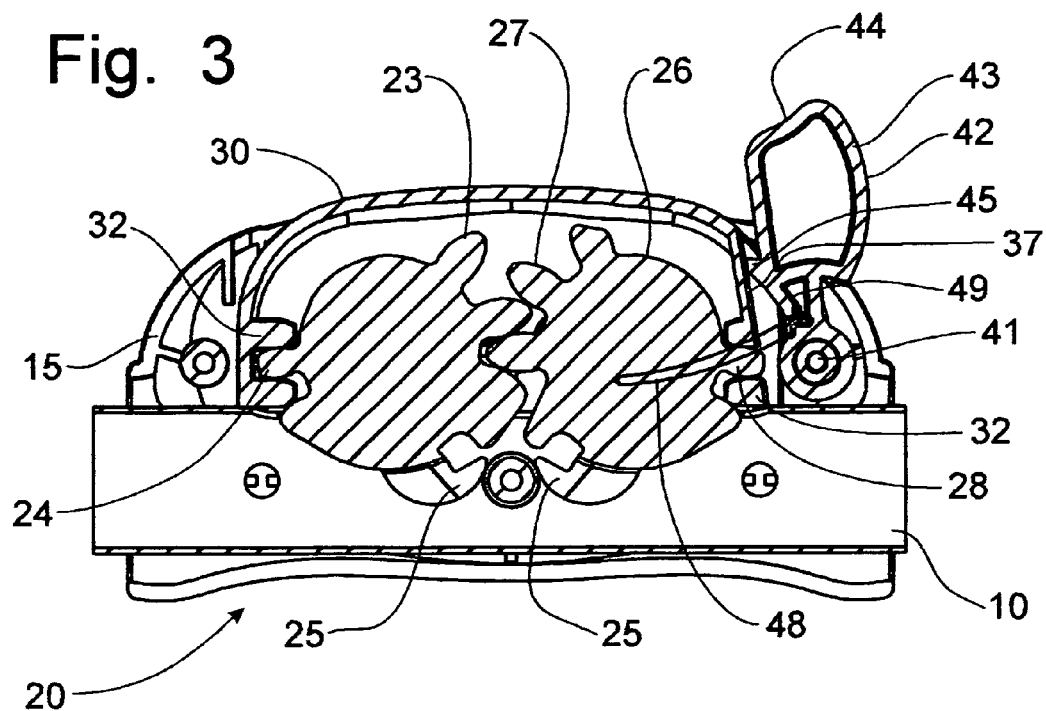
FIG. 3 is a cross-sectional view of the actuation portion of the one-hand fold mechanism similar to that of FIG. 2, but showing the one-hand fold mechanism in an actuated position.

Referring now to the drawings, an actuator for a one-hand fold mechanism on a child's stroller including a secondary lock device incorporating the principles of the instant invention. The one-hand fold mechanism is of the type disclosed in U.S. Pat. No. 6,339,862, issued to Kenny Cheng on Jan. 22, 2002, the contents of which are incorporated herein by reference. The one-hand fold mechanism of the instant invention, however, utilizes an actuator that engages the cam members on the outside surface, instead of on the interior surface, as is taught in the Cheng patent.

Figure 4:
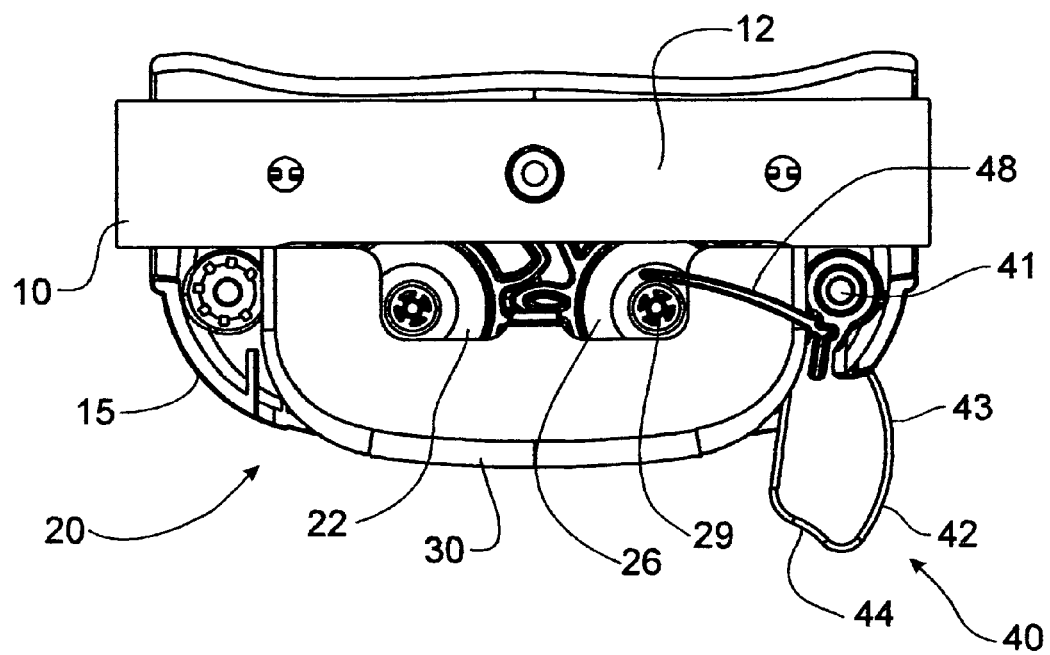
FIG. 4 is a top plan view of the actuation portion of the one-hand fold mechanism corresponding to lines 4-4 of FIG. 1.
Figure 5:
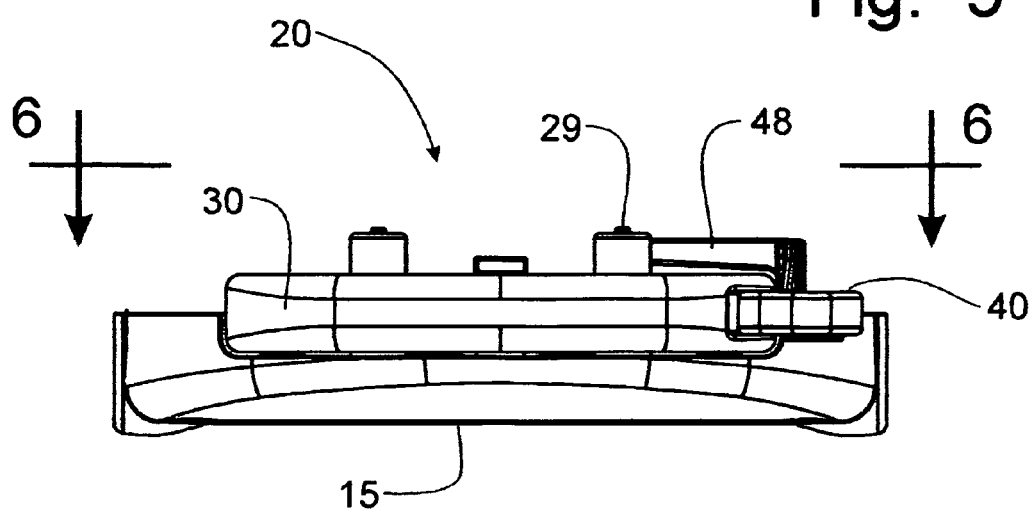
FIG. 5 is an enlarged elevational view of the actuation portion of the one-hand fold mechanism with the grip portion of the handle bar removed for purposes of clarity.
Figure 6:
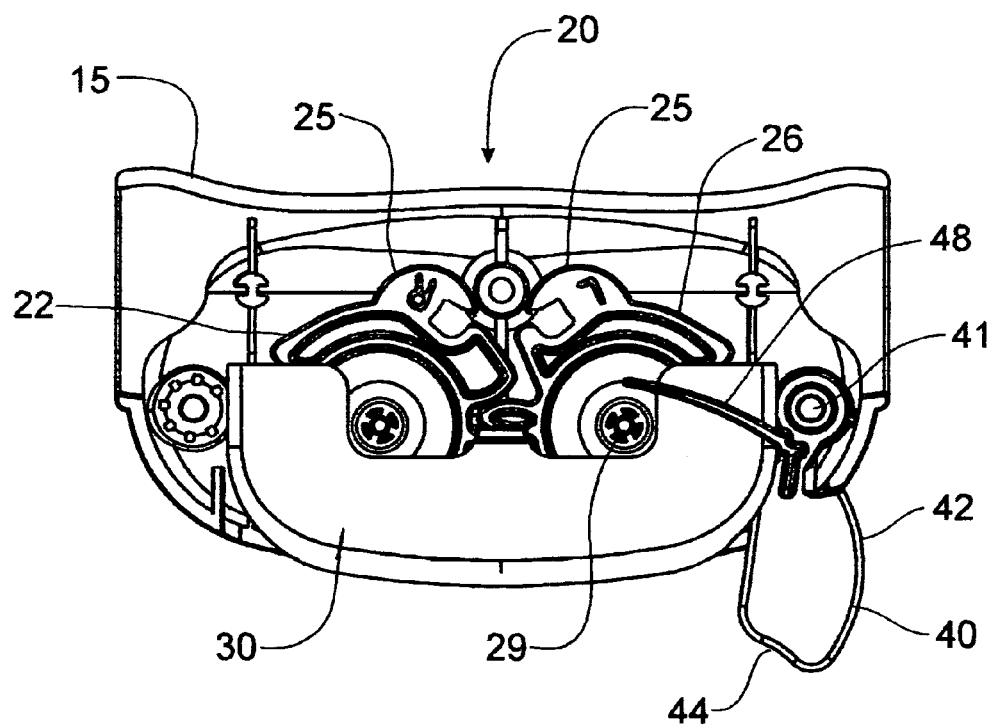
FIG. 6 is a top plan view of the actuation portion corresponding to lines 6-6 of FIG. 5.

As best seen in FIGS. 2-4, the one-hand fold actuation mechanism 20 is mounted on the grip portion 12 of the handle bar 10 for the child's stroller at a central location thereof facing the carriage part of the stroller. The actuation mechanism 20 includes a pair of cam members 22, 26 that have inner cooperatively engaged teeth 23, 27, respectively, on an inner portion of the circumferential periphery thereof. Each cam member 22, 26 is also formed with actuator teeth 24, 28, respectively, on the outer surface of the circumferential periphery thereof. While the inner teeth 23, 27 are cooperatively engaged to provide stability to the mechanism 20 and to assure simultaneous and coextensive rotation of the respective cam members 22, 26, the outer actuator teeth 24, 28 provide the rotation of the cam members 22, 26 through engagement with a rack 32 formed into the actuator 30. Each cam member 22, 26 is further formed with an attachment arm 25 to which a wire or cable (not shown) is connected within the handle bar 10 to activate unlocking devices as is disclosed in the aforementioned Cheng patent.

The actuator 30 is slidably mounted in the casing 15, which is affixed to the handle bar 10, for linear movement toward and away from the grip portion 12 of the handle bar 10. The movement of the actuator 30 toward the grip portion 12 moves the racks 32 inwardly toward the casing 15. The outer actuator teeth 24, 28, which are engaged with the racks 32, cause rotation of the cam members 22, 26 to move the attachment arms 25 inwardly, thus pulling against the locking devices (not shown) to allow the folding of the stroller.

With the positioning of the actuation mechanism 20 on the forward side of the handle bar 10, accidental movement of the actuator 30 is unlikely, but can happen particularly when the stroller is pulled rearwardly by the user grasping the grip portion 12 of the handle bar 10. To prevent any accidental actuation of the one-hand fold actuation mechanism 20, a secondary lock 40 is provided adjacent the actuator 30. The secondary lock 40 is formed of a lever 42 pivoted for lateral movement about a pivot 41 carried by the casing 15. As is best seen in FIG. 8, the lever 42 has a body 43 terminating in a manually engagable peripheral end 44. The body 43 is also formed with an outwardly projecting locking tab 45, which is engagable with a corresponding niche 35 formed in the actuator 30, as is best seen in FIG. 7. Referring to FIG. 2, when the actuator 30 is in the locked or home position, the locking tab 45 is positioned in the niche 35 to prevent the actuator 30 from sliding into the casing 15.

The secondary lock 40 is cooperable with a spring device 48 that biases the lever 42 toward engagement with the actuator 30. Preferably, this spring device 48 is a torsion spring mounted on the rotational axis 29 of the cam member 26 adjacent to the pivot 41. The spring device 48 can be attached to the lever 42 at an opening 49 formed in the lever 42. Thus, the manual movement of the lever 42 away from the actuator 30 pulls the locking tab 45 out of the niche 35 to allow the actuator to have an unrestricted linear movement into the casing to affect rotation of the cam members 22, 26. Once the lever is released, the biasing force exerted by the spring 48 pulls the lever 42 against a slide surface 37 of the actuator 30 to allow the locking tab 45 to ride against the slide surface 37 until the actuator 30 is returned to the home position, at which time the locking tab 45 pops into engagement with the niche 35 to lock the actuator against further movement until the secondary lock 40 is released again.

As is best seen in FIG. 2, the lever 42 is formed to mate against the actuator 30 when in the home or locked position and to have the peripheral end 44 project generally orthogonally therefrom, thus providing an intuitively operable secondary lock 40 that can be easily moved outwardly to release the actuator 30 with a flick of the user's finger. As can also be seen in FIGS. 2 and 3, the actuator 30 is preferably hollow and open toward the cam members 22, 26, so that upon a full inward movement of the actuator 30 to cause a release of the unlocking devices (not shown), the rotated cam members 22, 26 are received within the actuator 30, allowing for a compact actuation mechanism 20 design.

In operation, the stroller is convertible into a folded transport configuration by the operator grasping the actuator 30 on the interior, forward side of the grip portion 12 of the handle bar 10 and then laterally pivoting the secondary lock outwardly by either pushing with the user's finger or by sliding the user's hand against the peripheral end 44 of the lever 42. This pivotal movement of the lever 42 pulls the locking tab 45 out of the niche 35 in which it had been seated to prevent linear movement of the actuator 30. With the locking tab 45 disengaged from the niche 35, the actuator 30 is free to slide into the case. This sliding movement moves the racks 32 along the cam members 22, 26 to affect counter rotation thereof to draw the attachment arms 25 into the center of the casing 15, thus pulling on cables (not shown) situation within the handle bar 10 to release locking devices to allow folding of the stroller. Thus, a user can release the secondary lock 40 and depress the actuator 30 with a single hand to cause the stroller to be folded into a transport configuration.

While the actuator 30 is moving into the casing 15, the user release pressure on the lever 42 allowing the biasing force exerted by the spring 48 to pull the lever 42 against the actuator 30. Since the niche 35 is no longer aligned with the locking tab 45, the locking tab 45 will ride on the slide surface 37 of the actuator 30 until the actuator 30 is released outwardly. Preferably, the actuator 30 is provided with a spring return mechanism (not shown) to automatically return the actuator 30 to the outward home position. Once the actuator 30 reaches the home position, the niche 35 becomes aligned with the locking tab 45, which pops into the seated position within the niche 35 due to the spring force exerted by the spring 48, restricting the actuator from further movement until released by the user.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

For example, the locking tab 45 could be formed on the actuator 30 to be engagable with a niche 35 formed in the lever 42 to provide the same locking operation as described above. In such an alternative embodiment, the locking tab 45 would ride on the side of lever 42 until aligned with the corresponding niche 35 to restrain further linear movement of the actuator 30.

Having thus described the invention, what is claimed is:

1. An actuating mechanism for a foldable stroller having a handle bar with a grip portion, comprising:
    a casing mounted to said stroller;
    a pair of rotatable cam members each having an axis of rotation laterally spaced from the other respective axis of rotation, each said cam member having an attachment arm for connection of a release mechanism;
    an actuator slidably mounted in said casing for linear movement relative thereto between a home position and an actuated position, said actuator being engaged with said cam members to affect rotational movement of said cam members in response to a linear movement of said actuator; and
    a secondary lock pivotally mounted on said casing at a pivot and being spring-loaded for engagement with said actuator, said secondary lock having a body portion terminating in a peripheral end, said body portion being formed with a locking member engagable with a corresponding locking feature formed in said actuator when said actuator is in said home position to restrict said actuator from linear movement, wherein the locking member is located between said peripheral end and said pivot.

2. The actuating mechanism of claim 1 wherein said body portion is engaged with a spring mounted on the axis of rotation of one of said cam members to exert said biasing force thereon for urging said secondary lock into engagement with said actuator.

3. The actuating mechanism of claim 2 wherein said actuator is formed with a rack on each laterally opposed end thereof, each said cam member being formed with outer circumferential teeth that are engaged with the corresponding said rack so that linear movement of said actuator is translated into rotational movement of said cam members.

4. The actuating mechanism of claim 2 wherein said locking member is an outwardly projecting locking tab and said locking feature is a niche formed in said actuator for receiving said locking tab.

5. The actuating mechanism of claim 4 wherein said actuator is formed with a linear slide surface for engagement with said locking tab when disengaged from said niche.

6. The actuating mechanism of claim 5 wherein each said cam member is also formed with inner circumferential teeth that are interengaged to stabilize the rotation of said cam members.

7. The actuating mechanism of claim 6 wherein said peripheral end of said body portion is located adjacent said actuator when in said home position to be positioned as an extension of said actuator oriented generally orthogonally thereto.

8. The actuating mechanism of claim 7 wherein said actuator is hollow and open toward said cam members so that said cam members are received within said actuator when moved into said actuated position.

9. The actuating mechanism of claim 1 wherein said secondary lock includes a lever pivotally mounted on said casing at a pivot and being located adjacent one of said cam members, said lever having said body portion engagable with said locking feature such that a seated engagement of the locking member with the locking feature in the actuator prevents the actuator from undergoing linear movement, said lever being pivotally movable into and out of engagement with said actuator, said secondary lock further including a spring mounted on the axis of rotation of said one of said cam members and engaged with said lever to bias the pivotal movement of said lever toward engagement with said actuator.

10. The actuating mechanism of claim 9 wherein said locking member is an outwardly projecting locking tab and said locking feature is a niche formed in said actuator for receiving said locking tab.

11. The actuating mechanism of claim 10 wherein said actuator is formed with a rack on each laterally opposing side thereof, each said rack being engaged with a set of outer actuation teeth on each corresponding said cam member so that the linear movement of said actuator is translated into rotational movement of said cam members.

12. The actuating mechanism of claim 11 wherein each said cam member is also formed with inner circumferential teeth, the inner teeth of each cam member being engaged with the corresponding inner teeth of the opposing cam member.

13. The actuating mechanism of claim 12 wherein said actuator is hollow and open on a side thereof facing said cam members so that said cam members can be received within said actuator when said actuator is moved into said actuated position.

14. The actuating mechanism of claim 13 wherein said actuator is formed with a linear slide surface for engagement with said locking tab when disengaged from said niche.

15. An actuating mechanism for a foldable stroller having a handle bar with a grip portion, comprising:
    a casing mounted to said handle bar at a central portion of said grip portion;
    a pair of rotatable cam members each having an axis of rotation laterally spaced from the other respective axis of rotation, each said cam member having an attachment arm for connection of a release mechanism, each said cam member further including outer actuator teeth formed on an outer circumferential periphery thereof;
    an actuator slidably mounted in said casing for linear movement relative thereto between a home position and an actuated position, said actuator including a pair of laterally spaced racks engaged with said actuator teeth on corresponding said cam members to affect rotational movement of said cam members in response to linear movement of said actuator; and
    a secondary lock pivotally mounted on said casing and being spring-loaded for engagement with said actuator, said secondary lock having a body portion terminating in a peripheral end, said body portion being formed with a locking tab engagable with a niche formed in said actuator when said actuator is in said home position to restrict said actuator from linear movement.

16. The actuating mechanism of claim 15 wherein said actuator is formed with a linear slide surface for engagement with said locking tab when disengaged from said niche.

17. The actuating mechanism of claim 16 wherein each said cam member is also formed with inner circumferential teeth that are interengaged to stabilize the rotation of said cam members.

18. The actuating mechanism of claim 17 wherein said body portion is engaged with a torsion spring mounted on the axis of rotation of one of said cam members adjacent said secondary lock to exert said biasing force thereon for urging said locking tab into engagement with said niche.

19. The actuating mechanism of claim 18 wherein said secondary lock is pivotable about a pivot carried by said casing, said locking tab being located between said peripheral end and said pivot.

* * * * *